April 11, 1967  L. M. GREENE  3,313,153
TAKE-OFF ATTITUDE COMPUTER
Filed Jan. 7, 1965  2 Sheets-Sheet 2

INVENTOR
LEONARD M. GREENE
BY
Tuchtern, Tuchtern & Ottinger
ATTORNEYS

United States Patent Office 3,313,153
Patented Apr. 11, 1967

3,313,153
TAKE-OFF ATTITUDE COMPUTER
Leonard M. Greene, Chappaqua, N.Y. (% Safe Flight Instrument Corp., 4 Water St., White Plains, N.Y. 10601)
Filed Jan. 7, 1965, Ser. No. 424,049
22 Claims. (Cl. 73—178)

This invention relates to a take-off attitude computer.

More particularly, my invention pertains to a component of a system or instrument which has as its only function, or as one of plural functions, control of an airplane during climb-out. The control may be exercised directly, as for example, by having the system output feed an autopilot that varies the setting of the elevator surfaces of an airplane, or indirectly, as by having the system output furnish an air speed director command signal. In the latter instance the pilot, in striving to obey the the command, will vary the attitude of the airplane during take-off.

By way of example, an instrument in which the present invention may be embodied is shown, described and claimed in my copending U.S. application Ser. No. 304,915 filed Aug. 27, 1963, for Airplane Instrument Furnishing a Condition-Modified Air Speed Director Signal. The instrument of that application has an output which can be fed to an autopilot utilization mechanism that controls the attitude of the airplane during airborne take-off or can be fed to an air speed meter the reading on which is not a reading of actual air speed, but of a target, i.e., command, air speed which the pilot will attempt to maintain at full engine power during climb-out. If, for example, the target air speed denotes to the pilot that he should speed up the airplane, he will during a take-off climb-out lower the nose of the airplane, and if the target air speed indicates at such time that he is travelling too rapidly, he will raise the nose of the airplane.

In an instrument or system of this type several means supply outputs, i.e., signals, to a summing means, i.e., a computer. Among these means is a means that furnishes a biasing signal which is a function of a variable that changes with the prevailing power output of the airplane, as, for example, with the prevailing airborne climb-out attitude of the airplane. Typically, such a biasing means has an output signal that varies as a function of the pitch angle of the airplane, or as a function of the position of a fore-and-aft pendulum, or as a function of the rate of climb.

It is the primary purpose of my present invention to improve such as instrument or system by providing a means furnishing a modified biasing signal of the general character described above, to wit, a biasing signal which essentially is a modified function of a variable that changes with the prevailing power output of the airplane, as, for example, with the prevailing airborne climb-out attitude of the airplane, the modification reflecting another factor, to wit, the extent to which the thrust of the airplane present during climb-out exceeds a certain threshold that is a function of all-engine available maximum thrust.

The failure of an engine of a multi-engine aircraft which is taking-off is a hazard against which precautions must be taken in order to ensure the safety of the airplane. When a multi-engine airplane is climbing-out during take-off, having left the ground, and is proceeding along an ascending flight path, it is an important safety consideration to plan that the take-off climb-out path and the take-off climb-out speed will still clear the terrain, even if an engine should fail. Under a condition of engine failure, however, the airplane is operated at a minimum safe air speed and minimum climbing pitch angle.

For normal climb-out operation, that is to say, at full engine power and without engine failure, it is not desirable to use the minimum safe air speed associated with climb-out operation in which an engine has failed. Instead, it is desirable to utilize the power of an all-engine climb-out operation to obtain an increased air speed and a pitch angle that is increased, but to a lesser degree than if a minimum safe climbing air speed were maintained. The foregoing is described in my aforesaid copending application Ser. No. 304,915 in which the prevailing lift or air speed is biased with the pitch attitude of the airplane, among other factors, to obtain a command signal that brings about an increased air speed and an increased pitch angle when all the engines are operating at full throttle.

It is an object of the present invention to provide a means to develop a biasing signal which is a modified function of climb-out power output, e.g., climb-out attitude, and which will automatically determine the point, sometimes referred to as the "threshold," at which the air speed should start to increase in relationship to increased pitch angle, such threshold thereby discriminating between all-engine full power climb-out operation on the one hand, and an engine-out climb-out operation on the other hand.

More particularly, it is an object of my invention to provide a means of the character described for developing a biasing signal, which means will compare the power, e.g., pitch attitude, of the airplane during climb-out with a computed constant which constant is a function of the average maximum value of thrust that should be available during climb-out, said thrust being the same as that which was developed during an all-engine take-off run, it being understood that during the take-off run the airplane was accelerating at maximum power down a runway with its undercarriage in contact with the earth's surface. It should be mentioned that the take-off run can take place either on the ground, in which case the airplane's wheels will be in contact with the ground, or on water, in which case the float or floats will be in contact with the water surface.

Even more specifically, it is an object of my invention to provide a means of the character described for developing a biasing signal in which means a stored memory is used that, with a simple computer, provides a reference signal that is a measure of average acceleration during all-engine take-off ground roll against which reference signal there is compared a signal that is a function of the prevailing climb-out power, e.g., attitude, of the airplane, the difference output from the comparison, in the event the second signal exceeds the stored memory reference signal which functions as the threshold, constituting a biasing signal that will command an increase in the airplane's climbing speed. However, when the stored memory signal is the larger of the two signals compared, or when the two signals are equal, it will be an indication of an engine failure, and the biasing signal no longer will command an increase in climbing air speed and the airplane therefore will operate or be operated at a minimum safe climbing air speed and a minimum safe climbing pitch angle.

When an aircraft is accelerating down a runway prior to lift-off, it will be accelerating under the influence of all-engine operation for a period of time; otherwise, the pilot would abort the take-off. Pursuant to my present invention means is provided which is responsive to the acceleration of the airplane in a generally forward direction to measure the maximum ground roll acceleration and to store the same in a memory for future use as a reference signal. This reference signal will have a correlation to the threshold climbing pitch angle which discriminates between an all-engine operation and an engine-out operation and is used as the threshold of an increasing climbing air speed with increasing climbing pitch angle relationship. If an engine failure should occur during climb-out, the remaining thrust which is available will not be sufficient to achieve a climb-out pitch angle higher than the computed threshold and therefore the minimum engine-out safety climbing speed will be achieved. On the other hand, if the climb-out is under an all-engine operation, the pitch angle threshold, as determined by the memory reference signal, will be exceeded and additional safety for less critical and higher performance operation will be achieved.

Other objects of my invention in part will be obvious and in part will be pointed out hereinafter.

My invention accordingly consists in the features of construction, combinations of elements and arrangements of parts which will be exemplified in the devices hereinafter described and of which the scope of application will be indicated in the appended claims.

In the accompanying drawings in which are shown various possible embodiments of my invention, FIG. 1 is a schematic circuit diagram of a device, constructed in accordance with my invention, for furnishing a biasing signal that is a function of the climb-out attitude of an airplane in excess of a computed stored threshold memory signal which is a function of the average maximum value of thrust developed during a take-off run of the airplane;

Figure 1:
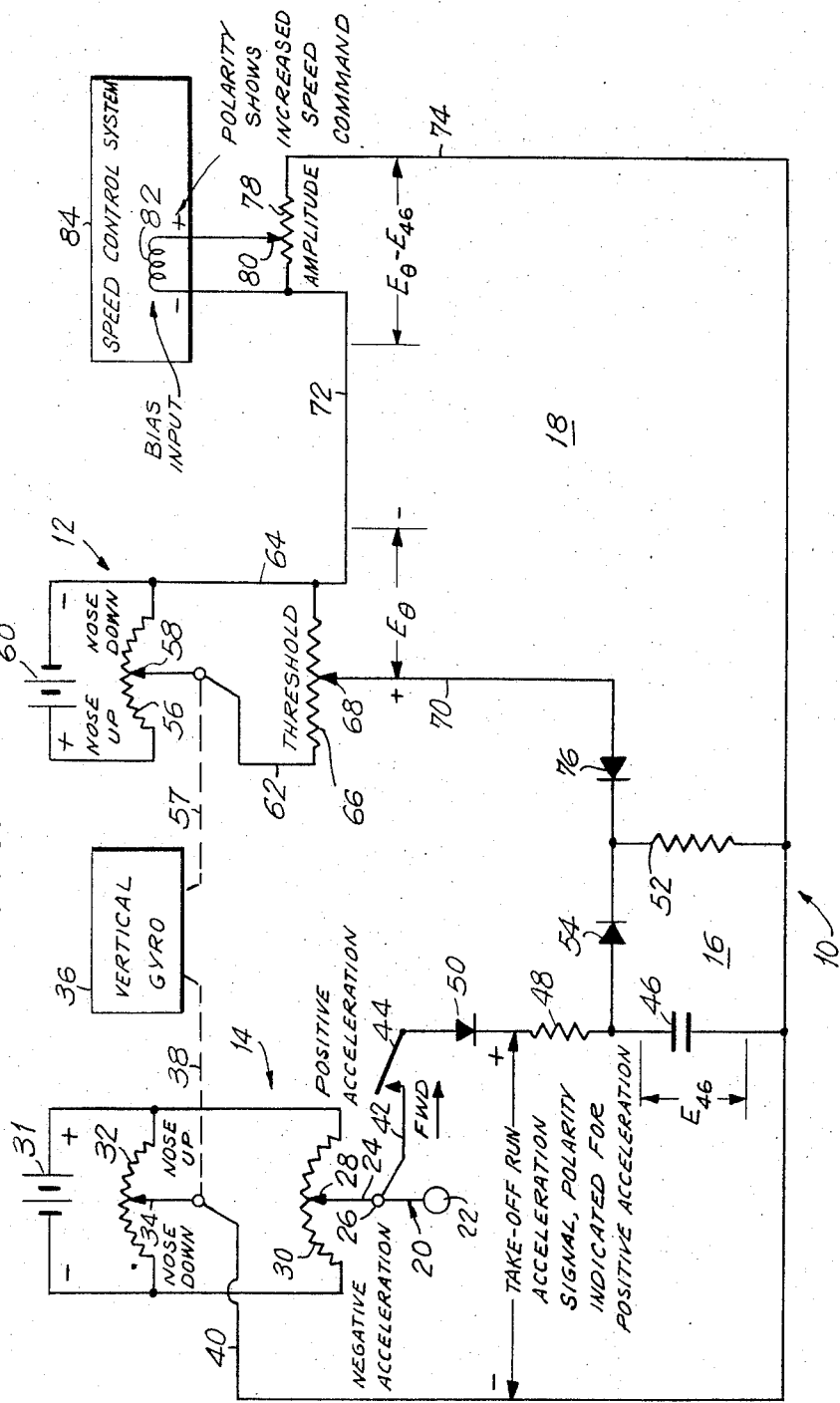

In general, I accomplish the purposes of my invention by providing a first means which is a climb-out power sensing means; by providing a second means that is responsive to acceleration developed during a take-off run; by providing a third means which integrates the output of the second means and stores the same as a memory for future use; and by providing a fourth means which compares the output from the first means with the memory output from the third means. The memory output from the third means supplies what is, in effect, a threshold value which is equalled to (balanced against) the output from the first means at a pitch angle that is the minimum for safe climb-out operation with an engine out; and whenever the output from the first means exceeds the memory output from the third means, a biasing signal will be furnished by the fourth means which can be used for various purposes, one such typical purpose being illustrated and described in my aforesaid copending application, to wit, when a pitch angle signal exceeds a threshold value the speed of the airplane will be commanded to be increased over a minimum climb-out air speed contemporaneously with an increase of the pitch angle over the minimum safe climb-out pitch angle.

The first means, to wit, the climb-out power sensing means, constitutes a means responsive to any variable which changes with the climb-out power of the airplane, one such variable being the climb-out attitude. For example, said first means may be, quite simply, a pitch gyro which furnishes a signal that is a measure of the pitch angle of the airplane referenced against a true vertical as established by the gyro. Said first means also may be in the form of a fore-and-aft pendulum the position of which is influenced by, and therefore a function of, the climb-out attitude of the airplane. Still further, the first means may take the form of a longitudinal accelerometer, to wit, a mass constrained for fore-and-aft movement against springs in a low friction guideway, this, in effect, being the physical equivalent of a fore-and-aft pendulum. Yet further, the first means may constitute a rate of climb sensing device. In each instance a decrease in the value of the variable mentioned, to wit, pitch angle, pendulum swingback, mass lagback and rate of climb, is an indication of decreased prevailing climb-out power.

The second means, i.e., the take-off run acceleration sensing means, constitutes a means responsive to any variable which changes with take-off run acceleration. For example, said second means may be a pitch corrected forward accelerometer, this being an inertial mass constrained for slidable or pivotal movement in a fore-and-aft plane and corrected to subtract the influence of pitch attitude. Said second means also may be in the form either of a fore-and-aft pendulum or a longitudinal (fore-and-aft) accelerometer, the output of neither being pitch corrected.

Both the first and second means include transducers to convert the variations in physical constants sensed thereby into electrical outputs.

The third means may be in the form of any memory storage that will file away for future use the average maximum output of the second means. Since the outputs in the forms of my invention to be described are electrical voltages, it is most convenient to fashion the third means as a capacitor, preferably as an RC circuit with an input charging time constant of a few seconds span and an output discharging time constant of several minutes. This enables the RC circuit to be charged over a short period of time that is, however, long enough to filter out transient variations in acceleration; thus the RC circuit will store a memory of the average maximum acceleration that persists at least as long as the input charging time constant. The prolonged output discharging time constant assures that the voltage memory will be available and will remain substantially constant as a storage memory voltage source for the time required to complete the climb-out, the output discharging time constant being, for this purpose, several times greater than the usual climb-out time.

Inasmuch as in the preferred form of my invention the memory and the first means have voltage outputs, the comparison means desirably is a simple bucking arrangement constituting a circuit in which the two voltages are opposed, the arrangement being such that the comparison means supplies a signal only when the voltage output from the climb-out power sensing means exceeds the voltage level of the memory storage.

The values of the voltage outputs from the climb-out power sensing means and from the memory storage means are so selected, as by control of the voltage sources or by output voltage amplitude adjustors, that at a predetermined pitch angle and at a full-throttle all-engine take-off run acceleration the voltage outputs are substantially equal. The predetermined pitch angle is a minimum for safe climb-out with an engine out. Hence, when the comparison means furnishes an output it is an indication that said minimum safe climb-out pitch angle is being exceeded and the output signal therefrom is a biasing signal in a mode that will command or bring about an increase in air speed, so that the climb-out pitch angle, although exceeding the minimum safe value, will not be increased as greatly as it would have if the air speed had not also been increased over the minimum safe climb-out air speed.

Referring now in detail to the drawings, and more particularly to FIG. 1, the reference numeral 10 denotes a biasing means embodying my invention and constructed to furnish a signal that will bias an airplane control in a sense to fly during climb-out at an air speed in excess of minimum climb-out air speed when the prevailing airplane power is in excess of the power required to fly at a minimum safe pitch angle.

Said biasing means 10 includes a climb-out power sensing first means 12, a take-off run acceleration sensing second means 14, a storage memory third means 16 and a comparison fourth means 18.

The take-off run acceleration sensing second means 14 comprises a fore-and-aft pendulum 20 constituting a bob 22 and an arm 24 mounted to swing about an axis 26 that is transverse to the longitudinal axis of the airplane and is horizontal when the airplane is in level flight. Said pendulum arm is connected physically to a movable wiper 28 riding on a potentiometer winding 30 fixed to the frame of the airplane. A source of D.C. voltage such as a battery 31 is connected across the potentiometer winding 30. The polarities are so arranged that a positive forward acceleration of the airplane increases the positive voltage on the wiper 28. Since the pendulum 20 is arranged to swing in a fore-and-aft plane when the airplane experiences positive forward acceleration the voltage appearing on the wiper 28 becomes more positive.

However, the voltage from the potentiometer winding 30 includes a pitch attitude factor since the position of the pendulum wiper 28 on the potentiometer winding is affected by both pitch attitude and forward acceleration. To subtract the pitch attitude factor I provide a second potentiometer winding 32 likewise fixed to the airplane frame and having an associated wiper 34. The potentiometer winding 32 is connected in parallel with the potentiometer winding 30. The wiper 34 is dirven by a vertical gyro 36, the mechanical connection being indicated by the dotted line 38. Thereby, the wiper 34 is held in a vertical position when, due to change in pitch attitude, the winding 32 is rotated with respect thereto, so that the position of the wiper 34 on the potentiometer is a function of pitch attitude. The two potentiometer windings 30, 32 are alike; thereby when at constant speed, or zero forward acceleration, the wipers 28, 34 are vertical, the signal appearing across the output leads 40, 42 from the second means 14 will be zero at all pitch attitudes. The effect of a change in either wiper position due to a change in pitch attitude is offset by a like change in the position of the other wiper. However, forward acceleration only affects the wiper 28 whereby the signal appearing across the leads 40, 42 will be a function simply of forward acceleration.

For a reason that later will be apparent, a single pole single throw switch 44 may be inserted in the output lead 42. This switch is operated in a conventional manner by the presence of weight on the airplane wheels. Therefore, the switch is closed when the wheels are in contact with the ground and is opened when the wheels leave the ground.

The storage memory third means 16 comprises a capacitor 46 connected across the output leads 40, 42 so as to be charged thereby. A resistor 48 is connected in series with the capacitor 46 in the output charging lead 42 so as to form $R_{48}C_{46}$ series input charging circuit The input time constant $R_{48}C_{46}$ of the charging series circuit is so selected that it is about five seconds in order to enable it to filter out transient variations in positive forward acceleration and yet enable the capacitor to be charged rapidly to a peak voltage corresponding to the peak acceleration that takes place during the take-off run. A diode 50 or other unidirectional conducting device is inserted in the input charging circuit between the resistor 48 and the switch 44, being oriented to ensure that the capacitor 46 can only be charged by positive forward acceleration during a take-off run and cannot be discharged through the potentiometer windings 30, 32 if the acceleration drops. Moreover, this discharge path is opened by the switch 44 when the airplane wheels leave the ground.

The storage memory third means 16 comprises a second resistor 52 connected in parallel with the capacitor 46 to form an $R_{52}C_{46}$ output discharge circuit. The output time constant $R_{52}C_{46}$ of the discharging parallel output circuit is so selected that it is several times greater than the usual climb-out time for the airplane. A suitable output time constant $R_{52}C_{46}$ of the discharging parallel output circuit is about fifteen minutes. This will assure that $E_{46}$, the storage memory voltage across the capacitor 46, will remain relatively constant for the four minutes or so typically required to complete a climb-out operation.

A diode 54 or other unidirectional conducting device is included in a leg of the parallel $R_{52}C_{46}$ output discharge circuit, this being the leg connecting a terminal of the resistor 52 to that terminal of the capacitor 46 which is connected to the resistor 48. Said diode 54 is oriented to prevent the memory storage capacitor 46 from being charged by a bucking higher voltage that in normal use will be applied across the output terminals of the memory storage means which constitute the terminals of the second resistor 52.

The value of the second resistor 52 in addition to being so selected as to provide a prolonged time constant $R_{52}C_{46}$ many minutes long, is large compared to the value of the input charging resistor 48 and to the values of the other resistors soon to be described in the first and fourth means.

It now will be apparent that the capacitor 46 will store for several minutes a voltage which is a function of the maximum acceleration value that is maintained for at least a few seconds during the take-off run.

The climb-out power sensing first means 12 comprises a potentiometer winding 56 having a wiper 58. The winding is fixed to the airplane frame and the wiper is driven by the vertical gyro 36, the mechanical connection being indicated by a dotted line 57. A source of D.C. voltage such as a battery 60 is connected across the potentiometer winding 56. Thereby, the value of the voltage appearing across the potentiometer output leads 62, 64 will be a function of prevailing pitch attitude of the airplane during climb-out. Since the climbing pitch attitude is, in turn, a function of prevailing climb-out power, said voltage 62, 64 is a function of prevailing climb-out power.

For regulation purposes, the winding 66 of a threshold potentiometer having a manually settable wiper 68 is connected across the leads 62, 64. Thereby, the output voltage $E_o$ from the first means 12 appearing across the output leads 64, 70 can be manually regulated to obtain a predetermined setting under certain conditions.

The comparison fourth means 18 comprises a circuit connecting the outputs from the climb-out power sensing first means 12 and the storage memory third means 16 in a fashion such that these outputs are opposed and the combined outputs will supply a comparison signal only when the output from the first means exceeds that from the third means. Said circuit includes a connection of the positive output lead from the first means to the positive terminal of the second resistor 52, this being the terminal that is connected to the second diode 54. Thus, said circuit includes orienting the battery 60 so that the output from the first means bucks that from the storage memory means. It will be observed that plus and minus signs for the signal polarity of the voltage $E_{46}$ in FIG. 1 correspond to a positive forward acceleration for the take-off run. It further will be observed that the plus and minus signs indicated for the voltage 64, 70 correspond to increasing climbing power, i.e., the greater the increased climbing power (as shown in FIG. 1 the greater the pitch attitude) the larger will be the value in the indicated polarity of $E_{64, 70}$. Thereby, the voltage appearing across the leads 72, 74 will be the difference between the two voltages $E_{46}$ and $E_{64, 70}$.

A third diode 76 or other unidirectional conducting device is inserted in the lead 70 in such orientation as to prevent the capacitor 46 from discharging through the leads 72, 74 into the utilization mechanism connected thereto. Said third diode thereby prevents a voltage signal from appearing on the leads 72, 74 when the voltage $E_{46}$ exceeds the voltage $E_{64, 70}$. Hence a comparison bias signal voltage output only will appear on the leads 72, 74 when the voltage $E_{64, 70}$ exceeds the voltage $E_{46}$, and such signal will only be of a polarity that results from a prevailing power signal that is an indication of a high (excessive) power, in this instance pitch angle. Accordingly, the bias signal output voltage $E_{72, 74}$ when it appears will indicate too high a pitch angle for the prevailing power and will command an increase in air speed which will be accomplished by a lessening of the pitch angle.

In operation the threshold potentiometer is manually set so that for a selected minimum safe climb-out pitch angle $\theta$ (for an engine-out operation) and a selected value of the maximum take-off run acceleration the voltage $E_{64, 70}$ ($E_o$) just equals the voltage $E_{46}$. Thus, the threshold value for the comparison bias signal output voltage $E_{72, 74}$ ($E_o - E_{46}$) is $\theta_{min.}$, i.e., when the pitch angle exceeds $\theta_{min.}$ a command signal $E_o - E_{46}$ appears on the leads 72, 74.

The leads 72, 74 are connected to opposite ends of an amplitude potentiometer winding 78 having a manually settable wiper 80. The output leads from the amplitude potentiometer are connected to a power bias input control winding 82 which is the utilization mechanism of the biasing means 10. Said winding 82 provides a control input which is a function of the amount the prevailing pitch attitude exceeds the minimum safe climb-out pitch attitude threshold value. Said control winding 82 is, as shown, part of a speed control system such, for instance, as shown in my said copending application Ser. No. 304,915 wherein the pitch input control winding over a high threshold is one of several inputs to a summing means such as a reset magnetic amplifier having an output control winding that feeds an ultimate utilization mechanism such as an automatic pilot or a meter that shows a command air speed.

It will be observed that the positive and negative signs appearing at the input control winding 82 show a bias signal that is a command indication that the air speed should be increased.

Figure 4:
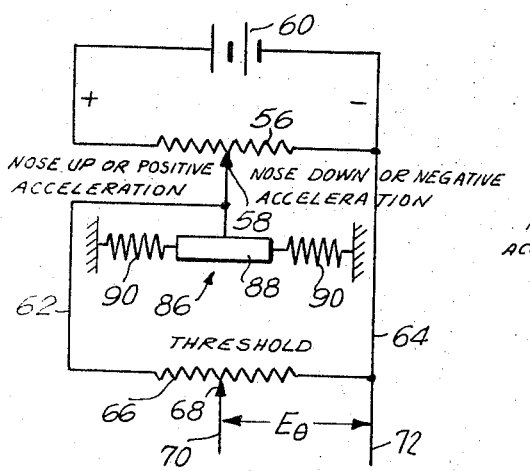
FIG. 4 is a view illustrating another modification of FIG. 1 in which the climb-out power is sensed by a longitudinal accelerometer instead of a pitch gyro.

As has been mentioned earlier, the climb-out power sensing means 12 may assume various forms. The means 12 which has been described with respect to FIG. 1 employs as part of the power sensor a vertical gyro 36 which is used to obtain a reference vertical line relative to which the pitch attitude of the airplane is measured. Thus, said vertical gyro holds steady in vertical position the wiper 58 with respect to which the potentiometer winding 56 fixed to the frame of the airplane moves, whereby the position of the wiper on the winding is a function of pitch attitude. Alternatively, I may employ a longitudinal slide accelerometer 86, as shown in FIG. 4. Said accelerometer replaces the vertical gyro 36 of FIG. 1 for control of the potentiometer winding 56. The longitudinal accelerometer regulates the position of the potentiometer wiper 58 on said winding. Thereby, the voltage signal appearing across the potentiometer output leads 62, 64 is a function of the prevailing climbing power as measured by the prevailing climbing pitch angle.

Specifically, the longitudinal slide accelerometer 86 constitutes a mass 88 in a low friction runway which constrains it for fore-and-aft linear movement against opposed springs 90. The battery 60 supplies voltage to the potentiometer winding 58 controlled by the slide accelerometer and the output leads 62, 64 are connected across the threshold potentiometer winding 66. Accordingly, the output voltage $E_o$ across the leads 64, 70 is a function of prevailing climbing pitch angle.

Figure 5:
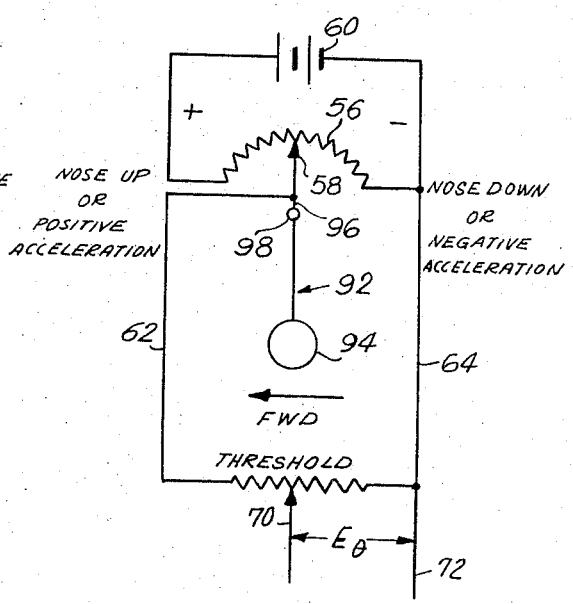
FIG. 5 is a view illustrating another modification of FIG. 1 in which the climb-out power is sensed by a fore-and-aft pendulum instead of a pitch gyro.

In FIG. 5 I have shown another means for sensing climb-out power by means of pitch angle (attitude), said means constituting a fore-and-aft pendulum 92 including a bob 94 and an arm 96. The arm swings about an axis 98 fixed to the frame of the airplane in a direction perpendicular to the longitudinal axis of the airplane and horizontal when the airplane is in level flight. Said pendulum drives the wiper 58 in lieu of the vertical gyro 36. The remaining components of the climb-out power sensing means are the same as those shown in FIGS. 1 and 4. The position of the pendulum wiper 58 with respect to the potentiometer winding 56 is a function of prevailing pitch angle and hence said sensing means provides an output $E_o$ which is responsive to the prevailing climbing pitch angle of the airplane.

Figure 6:
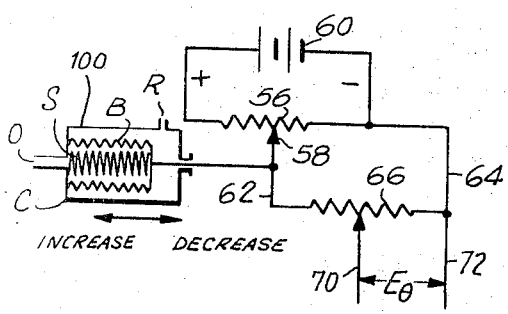
FIG. 6 is a view illustrating another modification of FIG. 1 in which the climb-out power is sensed by a rate of climb sensing device instead of a pitch gyro.

Still another construction for the climb-out power sensing means is shown in FIG. 6 wherein the wiper 58 is driven by a rate of climb device 100 comprising, for example, a bellows B in a container C. The bellows is urged to a null idle position by an internal spring S. The interior of the bellows is connected to the prevailing ambient atmosphere externally of the fuselage so that it is exposed to the prevailing static pressure. This connection is effected by a large opening O. A restricted orifice R connects the interior of the casing to the prevailing ambient atmosphere. Thus, the differential bellows will assume a position that is a function of the rate of climb. Said bellows is connected to the wiper 58. The wiper 58 will take a position on the potentiometer winding 56 which is responsive to the prevailing rate of climb. As the rate of climb increases the voltage $E_o$ will increase and vice versa. Said voltage will be a function of the prevailing climbing power and also of the prevailing pitch angle.

In all of these modified forms of physical construction for the first means the output voltage $E_{64', 70}$ varies with the climing power as exemplified by the pitch angle. Such output voltage will drop upon failure of an engine and such output voltage is connected in the sensing means 10 to buck the output voltage from the capacitor 46. In all cases the remainder of the circuit is the same.

Figure 2:
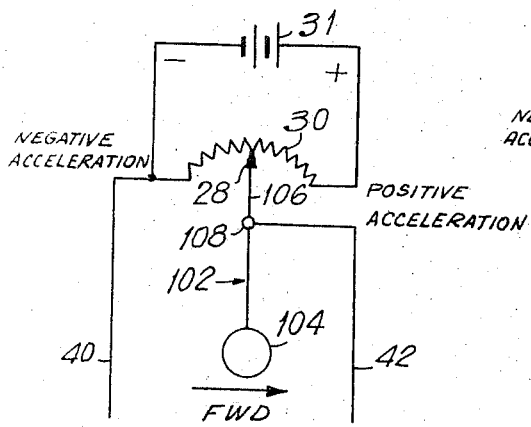
FIG. 2 is a view illustrating a modification of FIG. 1 in which the stored memory of take-off roll acceleration is derived from a fore-and-aft pendulum only instead of a pitch corrected forward accelerometer.
Figure 3:
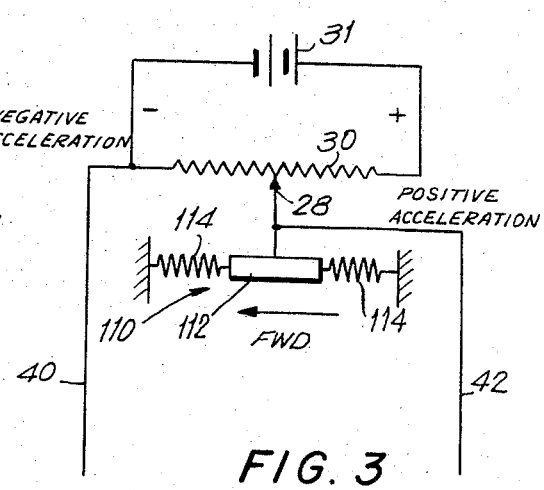
FIG. 3 is a view illustrating another modification of FIG. 1 in which the stored memory of take-off roll acceleration is derived from a longitudinal slide accelerometer instead of a pitch corrected forward accelerometer.

The take-off run acceleration sensing second means 14 likewise, as mentioned heretofore, may assume different forms. In FIG. 1 said second means has been shown in the form of a fore-and-aft pendulum type forward accelerometer the output from which is corrected to subtract the influence of pitch attitude as determined by the pitch attitude of the airplane with respect to a vertical gyro. I have found that due to the factors prevailing during the take-off run and pitch rotation of the airplane while still on the ground, and to the input charging and output discharging RC constants of the storage memory means, good results are obtained in the operation of my invention where the forward accelerometer does not have its output signal corrected for pitch attitude. In FIGS. 2 and 3 I have delineated two alternate modifications of the second means illustrating elimination in each instance of the pitch attitude correction. The FIG. 2 modification employs a fore-and-aft pendulum and the FIG. 3 modification employs a longitudinal slide accelerometer.

More specifically, in FIG. 2, the second means includes a sensor in the form of a fore-and-aft pendulum 102 comprising a bob 104 and an arm 106. The arm is mounted to turn about an axis 108 fixed with respect to the frame of the airplane and located perpendicularly to the longitudinal axis thereof, said axis 108 being horizontal when the aircraft is in level flight. The arm 106 controls the wiper 28 that rides on the acceleration potentiometer winding 30. Said potentiometer winding is supplied with power from the battery 31. The output leads 40, 42 are connected in the sensing means 10 in the manner described with respect to FIG. 1. It will be noted that positive forward acceleration, as in the case of the means 14 described with respect to FIG. 1, provides a positive potential on the lead 42 and a negative potential on the lead 40, so that the capacitor 46 is charged in a direction to buck the voltage output $E_o$ appearing on the leads 64, 70.

In FIG. 3 the second means constitutes a longitudinal slide accelerometer 110 including an inertial mass 112 constrained to move in a fore-and-aft linear direction in a low friction guideway against opposed springs 114. The mass 112 controls the position of the wiper 28 riding on the acceleration potentiometer winding 30 that is energized by the battery 31. The output from this sensing means appears on the leads 40, 42 and is connected in the biasing means 10 in the manner already described with respect to FIG. 1. Here too acceleration during a take-off run will make the lead 42 more positive than the lead 40 so as to charge the capacitor 46 in a proper direction to buck the voltage $E_g$.

It will thus be seen that I have provided biasing means which achieve the various objects of my invention and are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described my invention I claim as new and desire to secure by Letters Patent:

1. For use in an airplane intrument that controls the climb-out of an airplane, a biasing means including climb-out power sensing means having an output that varies as a function of prevailing climb-out power, means providing a storage memory output of the average maximum value of acceleration developed during a take-off run, the output of the climb-out power sensing means for a selected safe climb-out pitch angle being equal to the output from the storage memory means for a selected maximum value of acceleration, and means comparing said outputs and furnishing a biasing signal which is a function of the climb-out power in excess of that necessary to maintain the selected pitch angle.

2. For use in an airplane instrument that controls the climb-out of an airplane, a biasing means including climb-out pitch angle sensing means having an output that varies as a function of prevailing climb-out pitch angle, means providing a storage memory output of the average maximum value of acceleration developed during a take-off run, the output of the climb-out pitch angle sensing means for a selected safe climb-out pitch angle being equal to the output from the storage memory means for a selected maximum value of acceleration, and means comparing said outputs and furnishing a biasing signal which is a function of the climb-out pitch angle in excess of the selected pitch angle.

3. For use in an airplane instrument that controls the climb-out of an airplane, a biasing means including a climb-out power sensing first means having an output that varies as a function of prevailing climb-out power, a take-off run acceleration second means having an output that varies as a function of take-off acceleration, a storage memory third means for storing the average maximum value of the output of the second means for a time which is long in comparison with the climb-out time, the output from the third means for a selected maximum value of acceleration being equal to the output from the first means for a selected safe climb-out pitch angle, and a comparison fourth means comparing the output from the first means with the memory output from the third means and when the output from the first means exceeds the memory output from the third means furnishing a biasing signal that is a measure of the difference.

4. A biasing means as set forth in claim 3 wherein the first means is a pitch angle sensing means constituting a vertical gyro.

5. A biasing means as set forth in claim 3 wherein the first means is a pitch angle sensing means constituting a longitudinal slide accelerometer.

6. A biasing means as set forth in claim 3 wherein the first means is a pitch angle sensing means constituting a fore-and-aft pendulum.

7. A baising means as set forth in claim 3 wherein the first means includes a rate of climb device.

8. A biasing means as set forth in claim 3 wherein the second means is a pitch attitude corrected fore-and-aft pendulum.

9. A biasing means as set forth in claim 3 wherein the second means is a pitch attitude uncorrected forward accelerometer.

10. A biasing means as set forth in claim 3 wherein the second means is a pitch attitude uncorrected forward accelerometer constituting a fore-and-aft pendulum.

11. A baising means as set forth in claim 3 wherein the second means is a pitch attitude uncorrected forward accelerometer constituting a longitudinal slide accelerometer.

12. A biasing means as set forth in claim 3 wherein the third means includes a capacitor.

13. A biasing means as set forth in claim 3 wherein the third means includes an RC circuit having an input charging time constant of a few seconds and an output discharging time constant of several minutes.

14. A biasing means as set forth in claim 3 wherein the third means comprises an RC circuit having an input charging time of about five seconds and an output discharging time of about fifteen minutes.

15. A biasing means as set forth in claim 3 wherein means is included to connect the output from the second means to the third means when the airplane wheels are on the ground and to disconnect the output from the second means to the third means when the airplane wheels leave the ground.

16. For use in an airplane instrument that controls the climb-out of an airplane, a biasing means including a climb-out power sensing first means having an output that varies as a function of prevailing climb-out power, a take-off run acceleration second means having an output that varies as a function of take-off acceleration, a storage memory third means for storing the average maximum value of the output of the second means for a time which is long in comparison with the climb-out time, the output from the third means for a selected maximum value of acceleration being equal to the output from the first means for a selected safe climb-out pitch angle, and a comparison fourth means comparing the output from the first means with the memory output from the third means and when the output from the first means exceeds the memory output from the third means furnishing a biasing signal which is a function of the climb-out power in excess of that necessary to maintain the selected pitch angle.

17. For use in an airplane instrument that controls the climb-out of an airplane, a biasing means including a climb-out pitch angle sensing first means having an output that varies as a function of prevailing climb-out pitch angle, a take-off run acceleration second means having an output that varies as a function of take-off acceleration, a storage memory third means for storing the average maximum value of the output of the second means for a time which is long in comparison with the climb-out time, the output from the third means for a selected maximum value of acceleration being equal to the output from the first means for a selected safe climb-out pitch angle, and a comparison fourth means comparing the output from the first means with the memory output from the third means and when the output from the first means exceeds the memory output from the third means furnishing a biasing signal that is a measure of the difference.

18. For use in an airplane instrument that controls the climb-out of an airplane, a biasing means including a climb-out power sensing first means having an output that varies as a function of prevailing climb-out power, a take-off run thrust second means having an output that varies as a function of take-off thrust, a storage memory third means for storing the average maximum value of the output of the second means for a time which is long in comparison with the climb-out time, the output from the third means for a selected maximum value of thrust being equal to the output from the first means for a selected safe climb-out pitch angle, and a comparison fourth means comparing the output from the first means with the memory output from the third means and when the output from the first means exceeds the memory output from the third means furnishing a biasing signal that is a measure of the difference.

19. For use in an airplane instrument that controls the climb-out of an airplane, a biasing means including a climb-out pitch angle sensing first means having an output that varies as a function of prevailing climb-out pitch angle, a take-off run thrust second means having an output that varies as a function of take-off thrust, a storage memory third means for storing the average maximum value of the output of the second means for a time which is long in comparison with the climb-out time, the output from the third means for a selected maximum value of thrust being equal to the output from the first means for a selected safe climb-out pitch angle, and a comparison fourth means comparing the output from the first means with the memory output from the third means and when the output from the first means exceeds the memory output from the third means furnishing a biasing signal that is a measure of the difference.

20. For use in an airplane instrument that controls the climb-out of an airplane, a biasing means including a climb-out power sensing means having a D.C. voltage output that varies as a function of prevailing climb-out power, a take-off run acceleration second means having a D.C. output that varies as a function of take-off acceleration, a storage memory third means for storing the average maximum value of the output of the second means for a time which is long in comparison with the climb-out time, said third means including an RC circuit constituting a capacitor connected to be charged by the D.C. voltage output of the second means and a resistance in parallel with the capacitor, said capacitor and resistance having a prolonged discharge time constant and furnishing a storage memory voltage source which is a function of the average maximum value of the output of the second means, the value of said storage memory voltage source being equal to the D.C. output from the first means for a selected acceleration and for a selected safe climb-out pitch angle, and a comparison fourth means for comparing the output from the first means with the output from the third means and when the output from the first means exceeds the memory output from the third means furnishing a biasing signal, said fourth means constituting a circuit arrangement which opposes the voltage output from the first means to the voltage output from the third means, said third means including a unidirectional conducting device preventing charging of the capacitor by the voltage output from the first means.

21. A biasing means as set forth in claim 20 wherein a utilization mechanism is provided to which the biasing signal is supplied and wherein a second unidirectional device is included in the fourth means to prevent the capacitor from discharging through the utilization mechanism.

22. A biasing means as set forth in claim 21 wherein the third means includes a third unidirectional conducting device for preventing the capacitor from discharging through the second means.

References Cited by the Examiner
UNITED STATES PATENTS

| | | | |
|---|---|---|---|
| 3,042,540 | 7/1962 | L. Greene | 73—178 |
| 3,055,214 | 9/1962 | R. McLane | 73—178 |
| 3,200,642 | 8/1965 | C. Neuendorf et al. | 73—170 |
| 3,283,573 | 11/1966 | Bishop et al. | 73—178 |

LOUIS R. PRINCE, *Primary Examiner.*

N. D. SIEGEL, *Assistant Examiner.*